US009766341B2

(12) United States Patent
Chamseddine

(10) Patent No.: US 9,766,341 B2
(45) Date of Patent: Sep. 19, 2017

(54) GNSS POSITIONING SYSTEM EMPLOYING A RECONFIGURABLE ANTENNA SUBSYSTEM

(71) Applicant: NovAtel Inc., Calgary (CA)

(72) Inventor: Ahmad Chamseddine, Calgary (CA)

(73) Assignee: NovAtel Inc., Calgary, Alberta (CA)

( * ) Notice: Subject to any disclaimer, the term of this patent is extended or adjusted under 35 U.S.C. 154(b) by 313 days.

(21) Appl. No.: 14/540,502

(22) Filed: Nov. 13, 2014

(65) Prior Publication Data

US 2016/0139271 A1   May 19, 2016

(51) Int. Cl.
*G01S 19/13* (2010.01)
*G01S 19/21* (2010.01)
*G01S 19/22* (2010.01)
G01S 19/36 (2010.01)
H01Q 3/24 (2006.01)
H01Q 21/24 (2006.01)

(52) U.S. Cl.
CPC ............ *G01S 19/13* (2013.01); *G01S 19/21* (2013.01); *G01S 19/22* (2013.01); G01S 19/36 (2013.01); H01Q 3/24 (2013.01); H01Q 21/245 (2013.01)

(58) Field of Classification Search
CPC ................................ G01S 19/09; G01S 19/42
USPC ............ 342/357.21, 357.25, 357.46, 357.51, 342/357.71; 701/468, 470
See application file for complete search history.

(56) References Cited

U.S. PATENT DOCUMENTS 3,373,433 A   3/1968   Blaisdell
5,659,322 A   8/1997   Caille
5,818,389 A   10/1998  Lazar
6,154,173 A   11/2000  Lennen
6,750,816 B1  6/2004   Kunysz
7,671,791 B2  3/2010   Feller
7,804,887 B2  9/2010   Page
8,547,276 B2  10/2013  Cole et al.

(Continued)

FOREIGN PATENT DOCUMENTS

GB         2 494 150 A        3/2013

OTHER PUBLICATIONS

European Search Report mailed Dec. 4, 2016 for European Application No. 15187412.8-1812 International Filing Date Oct. 12, 2015 for Novatel, Inc., 8 pages.

(Continued)

*Primary Examiner* — Dao Phan
(74) *Attorney, Agent, or Firm* — Cesari and McKenna, LLP

(57) ABSTRACT

The system includes a reconfigurable GNSS antenna subsystem that dynamically reconfigures one or more antenna parameters to change one or more operating characteristics of an antenna based on environmental conditions and/or the presence of interfering signals to improve the quality of GNSS satellite signal reception. The system analyzes the received signals to determine if the GNSS satellite signals are sufficiently above received noise, if interfering signals are present, and/or if multipath signals are adversely impacting position calculations. Based on the analysis, the reconfigurable antenna subsystem selectively and dynamically reconfigures one or more parameters to change one or more operating characteristics of the antenna. As the conditions change, the reconfigurable antenna subsystem may dynamically reconfigure one or more of the antenna parameters accordingly.

22 Claims, 7 Drawing Sheets

(56) References Cited

U.S. PATENT DOCUMENTS

2003/0043086 A1     3/2003   Schaffner
2013/0142295 A1     6/2013   Badke

OTHER PUBLICATIONS

McMilin, Emily, De Lorenzo, David S., Walter, Todd, Lee, Thomas H., Enge, Per, "Single Antenna GPS Spoof Detection that is Simple, Static, Instantaneous and Backwards Compatible for Aerial Applications," *Proceedings of the 27th International Technical Meeting of The Satellite Division of the Institute of Navigation (ION GNSS+ 2014)*, Tampa, Florida, Sep. 2014, pp. 2233-2242.

GNSS POSITIONING SYSTEM EMPLOYING A RECONFIGURABLE ANTENNA SUBSYSTEM

BACKGROUND OF THE INVENTION

Field of the Invention

The invention relates generally to GNSS positioning systems, and in particular, to GNSS positioning systems that employ a reconfigurable antenna subsystem.

Background Information

Global navigation satellite systems (GNSS) provide ranging signals that are utilized in applications that determine global positions for surveys, global positions for delivery trucks, global positions for aircraft at and/or approaching airports, and so forth. As is well known, GNSS antennas receive signals from a plurality of GNSS satellites and associated GNSS receivers determine positions based on the timing of codes and carriers in the received GNSS satellite signals.

Environmental conditions (e.g., buildings, objects, mountains, trees, etc.) may adversely affect the receipt of the GNSS satellites signals at the GNSS antennas. Some or all of the direct path GNSS satellite signals may be blocked and/or the signals may be reflected to the antennas as multipath signals. In addition, jammers may transmit interfering signals (e.g., jamming signals) that intentionally or unintentionally disrupt position calculation operations performed by the GNSS receivers.

SUMMARY OF THE INVENTION

The inventive system and method utilizes a reconfigurable GNSS antenna subsystem that dynamically reconfigures antenna subsystem parameters to change one or more operating characteristics of the antenna based on environmental conditions and/or the presence of interfering signals.

The system analyses the received signals to determine if the GNSS satellite signals are sufficiently above received noise, if interfering signals are present, if multipath signals are adversely impacting position calculations, and/or if the antenna has an obstructed view of the sky. Based on the analysis, the system dynamically reconfigures one or more of the antenna subsystem parameters, to change one or more operating characteristics of the antenna, in order to improve the quality of GNSS satellite signal reception. The reconfigurable antenna subsystem selectively operates various electrical, mechanical, and/or software controlled switches to include or exclude antenna elements, utilize various filters, and so forth, to reconfigure antenna radiation pattern, frequency bandwidth and polarization diversity, and so forth, to improve the reception of the GNSS satellite signals under the conditions in which the antenna is then operating. As the conditions change, the reconfigurable antenna subsystem may dynamically reconfigure one or more of the antenna parameters, and thus, change one or more of the operating characteristics of the antenna, accordingly.

The reconfigurable antenna subsystem may selectively and dynamically reconfigure one or more of the parameters until GNSS signal reception is improved. By reconfiguring the parameters in this manner, the system may utilize a single antenna in place of multiple antennas and/or avoid complex processing to determining the directions of jammers for null steering, and so forth, resulting in significant savings in terms of cost and complexity.

BRIEF DESCRIPTION OF THE DRAWINGS

The advantages of the subject matter herein may be better understood by referring to the following description in conjunction with the accompanying drawings in which like reference numerals indicate identically or functionally similar elements, of which.

DETAILED DESCRIPTION OF AN ILLUSTRATIVE EMBODIMENT

Figure 1:
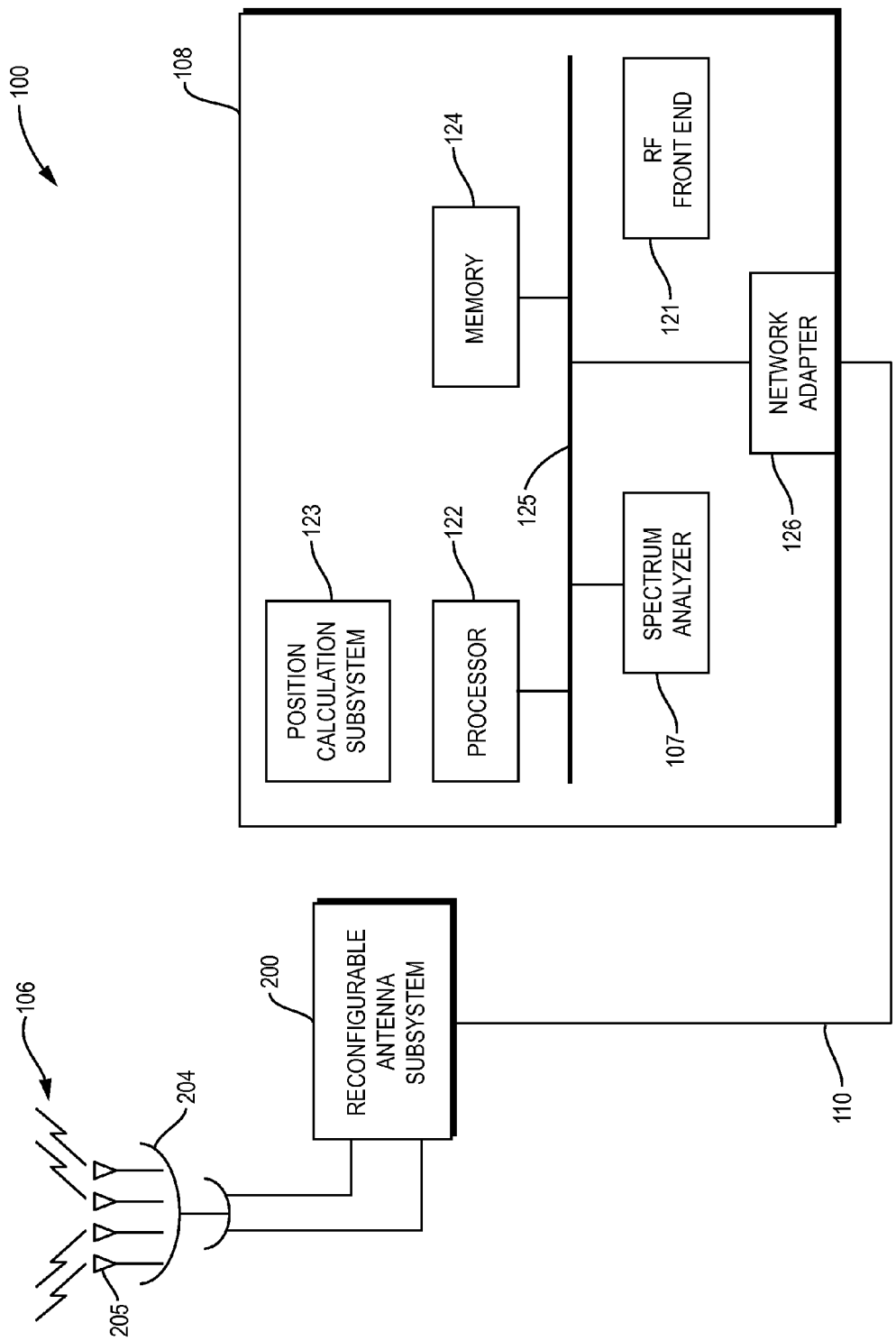
FIG. 1 illustrates a system constructed in accordance with the invention.

Referring to FIG. 1, a system 100 includes a reconfigurable antenna subsystem 200 having an antenna 204 with one or more antenna elements 205. The antenna 204 receives GNSS satellite signals and other signals, such as multipath signals and/or interfering (e.g., jamming) signals, referred to herein collectively by reference number 106. The reconfigurable antenna subsystem 200 provides the received GNSS satellite signals to a GNSS receiver 108 and receives information from the GNSS receiver 108 over a link 110, which may be a bidirectional communication link, as shown in FIG. 1, or alternatively a wireless network (not shown) that operates in a known manner.

The GNSS receiver 108 includes an RF front end 121 and a position calculation subsystem 123 that operate, respectively, in known manners. In addition, the GNSS receiver includes a processor 122, a memory 124, a network adapter 126, and a spectrum analyzer 107 that are interconnected by a system bus 125. In an embodiment, the memory 124 includes memory locations that are addressable by the processor 122 and adapter 126 for storing software programs and/or processes and data structures associated with embodiments discussed herein. The processors 122 and adapter 126 may include processing elements and/or logic circuitry configured to execute the software programs/processes and manipulate the data structures.

Illustratively, the position calculation subsystem 123 operates with the processors 122, which include the processing elements and/or logic circuitry, to operate in a known manner to calculate position information utilizing the GNSS satellite signals received by the antenna 204 of the reconfigurable antenna subsystem 200. In a known manner, the strength of the GNSS satellite signals may be determined. Illustratively, the spectrum analyzer 107 determines a $C/N_0$ (carrier-to-noise density) for the received GNSS satellite signals, where the $C/N_0$ is the ratio of received carrier power to noise density that is measured in decibels-hertz (dB-Hz). It is noted that higher $C/N_0$ values result in reduced data bit error rates (when extracting the information from the GNSS signals 106) and reduced carrier and code tracking loop jitter. Reduced carrier and code tracking loop jitter, in turn, results in less noisy range measurements and thus more accurate position calculations by the GNSS receiver 108.

Illustratively, the processor 122 may compare the determined $C/N_0$ value to a GNSS signal strength threshold value, which may be set by a user utilizing the system 100 or may be preconfigured by a manufacturer of the reconfigurable antenna subsystem 200 and/or a manufacturer of the GNSS receiver 108. The determined $C/N_0$ value being below the GNSS signal strength threshold value indicates that the received GNSS satellite signals are only slightly above the level of the received noise and thus, the GNSS satellite signals may be difficult to track. The $C/N_0$ ratio may be used as an indication of signal quality of the received GNSS signals.

In addition, the spectrum analyzer 107 operates in a known manner to determine the overall power of the signals 106 received by the antenna 204. The overall power being well above an expected higher power threshold value indicates the presence of an interfering signal, which may result in the GNSS receiver being unable to process the signals due to swamping of RF front end components such as AGC circuitry, amplifiers, and so forth. A signal strength below an expected lower threshold value indicates that the antenna 204 may have an obstructed view of the sky.

Furthermore, the processor 122 includes the processing elements and/or logic circuitry that operate in a known manner to determine the extent to which received multipath signals are adversely affecting position calculations. Based on the overall signal power, the $C/N_0$ value, and/or a determination that received multipath signals are adversely affecting position calculations, the system may dynamically change one or more antenna parameters to change one or more operating characteristics of the antenna 204.

More specifically, the processor 122 may determine that the overall power of the signals 106 is above a higher power threshold value, indicating the interfering signal is present, and send one or more commands to the reconfigurable antenna subsystem 200 to reconfigure one or more of the parameters. Alternatively, the processor 122 may determine that the overall power of the signals 106 is below a lower threshold value, indicating that the antenna 204 has an obstructed view of the sky, and send one or more commands to the reconfigurable antenna subsystem 200 to reconfigure one or more of the parameters.

In addition, the processor 122 may assign a multipath index value from, for example, 0 to 5, to the signals 106 indicating the extent to which the multipath signals are adversely affecting position calculations, based on, for example, the timing of receipt of the multipath signal relative to the direct path signal, and so forth. If the assigned multipath index value is above a multipath threshold value, the processor 122 may send one or more commands to the reconfigurable antenna subsystem 200 to reconfigure one or more of the parameters. It is noted that the multipath threshold values may be set by a user utilizing the system 100 or may be preconfigured by a manufacturer of the reconfigurable antenna subsystem 200 and/or a manufacturer of the GNSS receiver 108.

Figure 2:
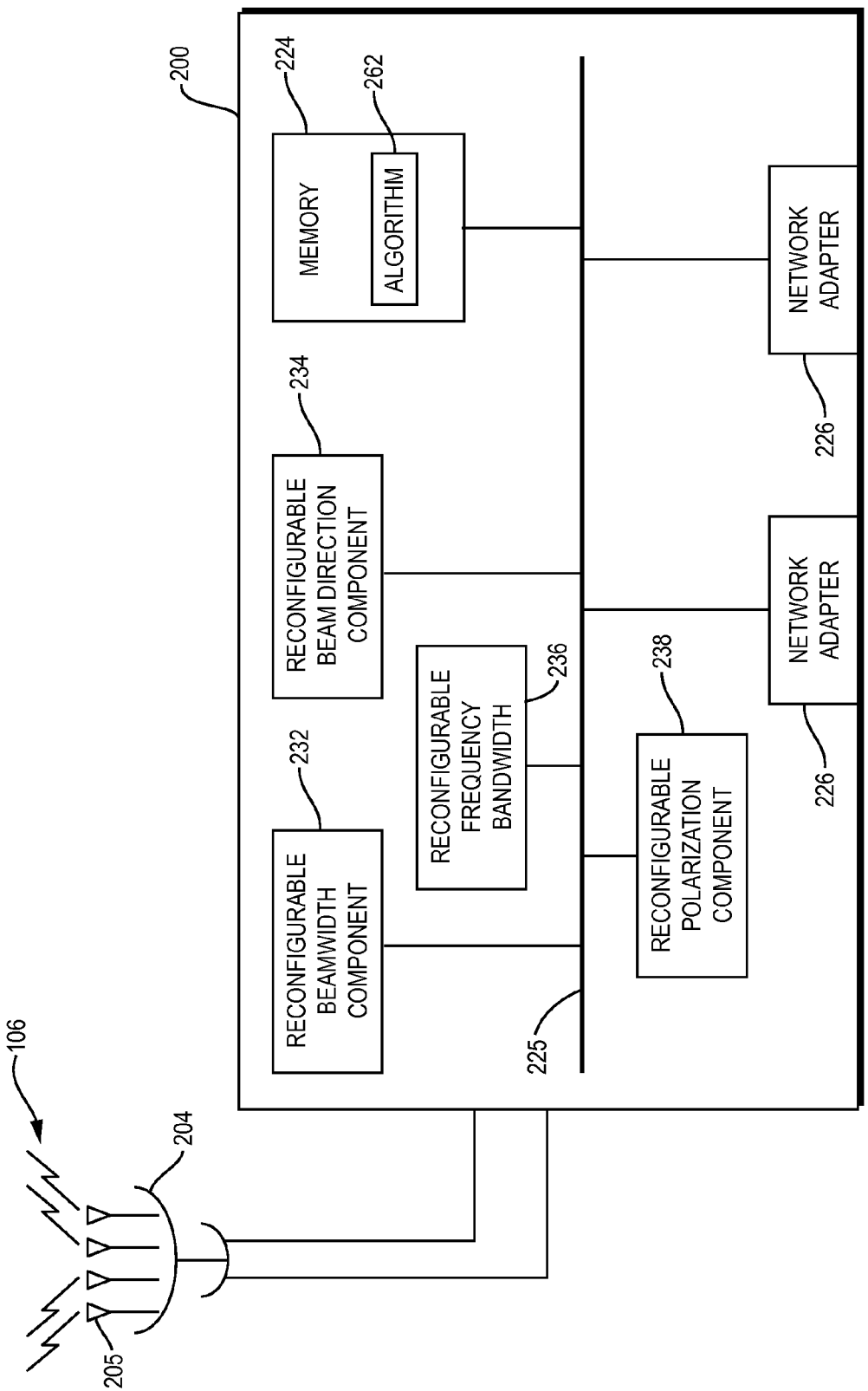
FIG. 2 illustrates a reconfigurable antenna subsystem constructed in accordance with the invention.

Referring to FIG. 2, the reconfigurable antenna subsystem 200 in addition includes a memory 224, a reconfigurable beamwidth component 232, a reconfigurable beam direction component 234, a reconfigurable frequency bandwidth component 236, a reconfigurable polarization component 238, and a network adapter 226 that are interconnected by a system bus 225. In an embodiment, the memory 224 includes memory locations that are addressable by the components and adapters for storing software programs and/or processes and data structures associated with embodiments discussed herein. The components 232, 234, 236, 238, and adapter 226 may include processing elements and/or logic circuitry configured to execute the software programs/processes, in response to commands from the GNSS receiver 108, as described below.

Illustratively, the network adapter 226 of the reconfigurable antenna subsystem 200 is utilized to communicate with the GNSS receiver 108. For example, the reconfigurable antenna subsystem 200 may receive one or more commands from the GNSS receiver 108 over link 110 utilizing the network adapter 226. The one or more commands may instruct the respective components to dynamically and selectively reconfigure one or more of the parameters associated with the antenna 204 of the reconfigurable antenna subsystem 200. The one or more parameters may include, but are not limited to, a radiation pattern (e.g., shape and/or direction), a frequency bandwidth, and a polarization associated with the antenna of the reconfigurable GNSS antenna subsystem. Specifically, and based on the overall power of the signals 106, the $C/N_0$ value, and/or determining that received multipath signals are adversely affecting position calculations, the antenna subsystem 200 may be instructed to dynamically and selectively operate switches that control the utilization of particular filters, the connection of lines to ground, and so forth, to reconfigure parameters to change one or more operating characteristics of the antenna 204. It is noted that the any number of the parameters may be reconfigured, e.g., simultaneously, consecutively, or incrementally, and the parameters may be reconfigured in any order.

Specifically, the reconfigurable beamwidth component 232 reconfigures the beamwidth of the antenna 204 of the reconfigurable antenna subsystem 200 in response to receiving one or more commands from the GNSS receiver 108. Prior to reconfiguration, the antenna 204 operates with conventional hemispherical beamwidth coverage looking skyward for acquiring signals transmitted by GNSS satellites at any elevation angle above the horizon, including satellites at low elevations. However, in certain environments, for example, urban environments, conditions (e.g., high-rise buildings, trees and so forth) may reflect GNSS satellite signals to the antenna as multipath signals that arrive at the antenna 204 relatively close in time to the direct path GNSS satellite signals. The multipath signals may then negatively impact position calculations performed by the GNSS receiver 108. One way to potentially minimize the negative impact of multipath signals is to narrow the antenna beamwidth, to essentially avoid signals from nearby reflections.

In addition, jammers, which may intentionally or unintentionally produce interfering signals, typically reside close to the horizon. Thus, one way to minimize the interference is to narrow the beamwidth to essentially avoid signals from the jammers.

Specifically, the reconfigurable beamwidth component 232 reconfigures, e.g., narrows, the beamwidth of the antenna 204 to lessen or eliminate the undesired multipath signals from the nearby reflectors and/or to eliminate the interfering signal produced by the jammers residing close to the horizon. The reconfigurable beamwidth component 232 utilizes one or more inductors to switch "in" (e.g., to receive signals 106) or switch "out" (e.g., to not receive signals 106) respective antenna elements 105 to reconfigure, e.g., narrow, the beamwidth. For example, for a spiral antenna, a given spiral element may be switched out by tying the element to ground using, for example, an inductor. The reconfigurable beamwidth component 232 may narrow the beamwidth by up to 45% of the original beamwidth by selectively switching respective antenna elements 105 in or out to reconfigure the parameters to change the operating characteristics of the antenna. Alternatively, the reconfigurable beamwidth component 232 may implement an algorithm 262 stored in memory 224 indicating the manner in which the beamwidth should be reconfigured.

Although narrowing the beamwidth may cause the antenna 204 to receive GNSS satellite signals from a reduced number of GNSS satellites at a given time, the signals 106 received at the antenna 204 and utilized by GNSS receiver 108 will not include certain multipath signals and/or interfering signals. The antenna subsystem 200 may narrow the beamwidth incrementally essentially testing after each increment to determine if the quality of the reception of the GNSS satellite signals has improved. Alternatively, the antenna subsystem 200 may narrow the beamwidth by a prescribed amount.

After the beamwidth has been reconfigured, the antenna subsystem 200 provides signals received at antenna 204 to the GNSS receiver 108 over link 110. The processor 122 of the GNSS receiver 108 processes the received signals and determines if the associated multipath index value is still greater than or equal to the multipath threshold value and/or if the overall power of the signals 106 is still greater than or equal to the higher power threshold value. Based on this determination, the processor 122 may send one or more additional commands to the reconfigurable beamwidth component 232 to again reconfigure, e.g., narrow, the beamwidth of the antenna 204 by a further percentage or amount, and so forth, until the associated multipath index value is less than the multipath threshold value and/or the overall power of the signals 106 is less than the higher power threshold value. If after an iteration the associated multipath index value is determined to be less than the multipath threshold value and/or the overall power of the signals 106 is less than the higher power threshold value, the system continues to operate with the narrowed beamwidth, thus, the GNSS receiver 108 processes the signals received by the reconfigured antenna to calculate position information in a known manner.

Figure 3:
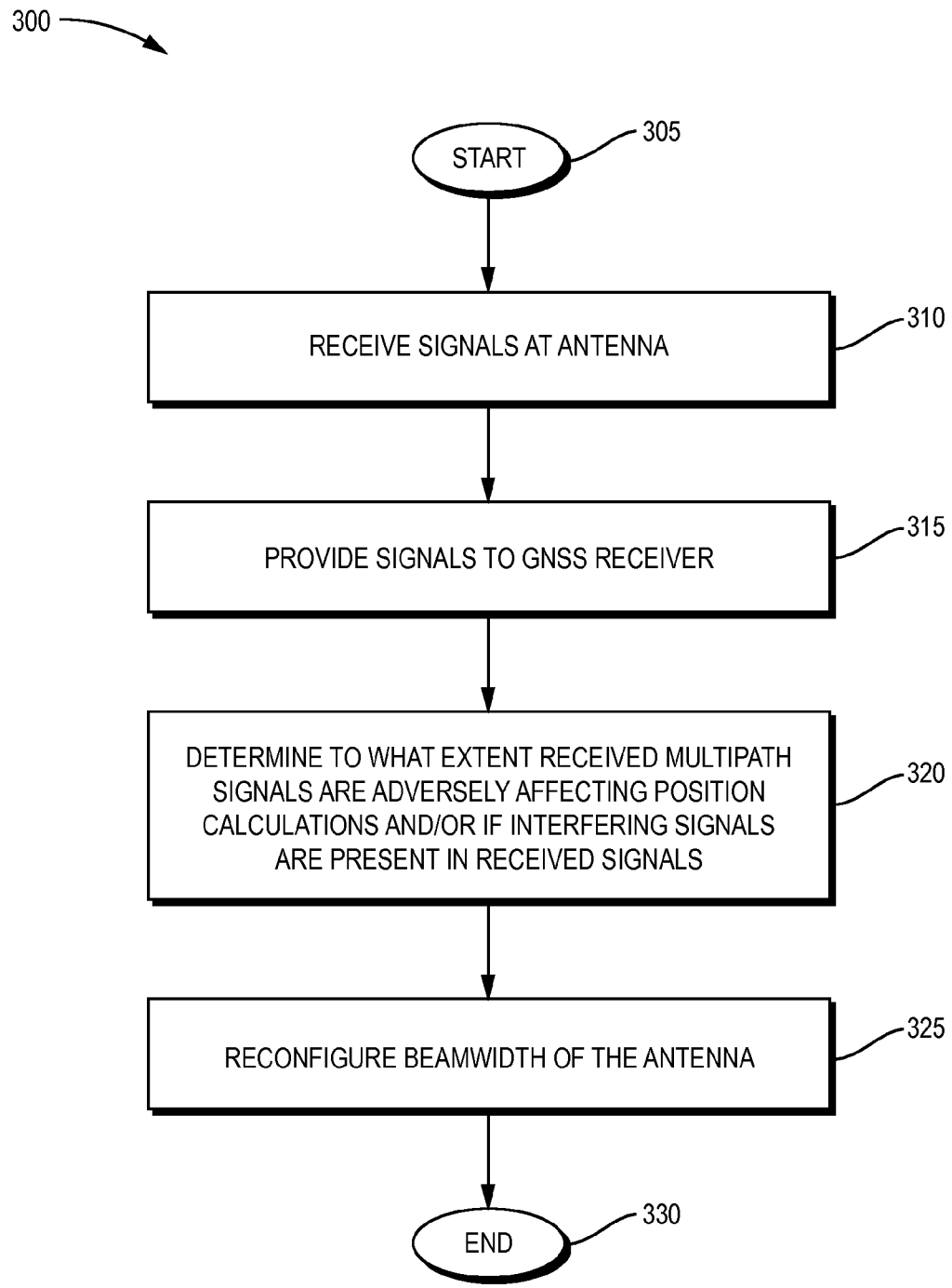
FIG. 3 is a flow chart of the operation of the system for reconfiguring a beamwidth for the reconfigurable antenna subsystem.

FIG. 3 is a flow chart of the operations of the system for reconfiguring the beamwidth for the reconfigurable antenna subsystem 200. The procedure 300 starts at step 305 and in step 310 the signals 106 are received at the antenna 204 of the reconfigurable antenna subsystem 200. Next, in step 315 the signals 106 are provided to the GNSS receiver 108. In step 320 the GNSS receiver 108 operates in a known manner to determine to what extent received multipath signals are adversely affecting position calculations and/or if interfering signals are present in the received signals 106. Specifically, a multipath index value is assigned to the received signals and compared to a multipath threshold value to determine the extent received multipath signals are adversely affecting position calculations. More specifically, the system determines if the assigned multipath index value is greater than or equal to the multipath threshold value. In addition, the system determines if the overall power of the received signals is above a higher power threshold value, to determine if interfering signals are present.

The procedure continues to step 325 where the beamwidth of the antenna 204 is reconfigured based on a determination that the received multipath signals are adversely affecting position calculations and/or that interfering signals are present in the received signals. Specifically, one or more commands are sent from the GNSS receiver 108 to the reconfigurable antenna subsystem 200, and the reconfigurable beamwidth component 232 reconfigures the beamwidth by selectively switching antenna elements 105 in or out, to reconfigure the beamwidth of the antenna 204. It is noted that the reconfigurable beamwidth component 232 can incrementally reconfigure the beamwidth until either the associated multipath index value is less than the multipath threshold value and/or the overall power of the received signals is less than the higher power threshold value, and/or the beamwidth has been narrowed to a predetermined maximum percentage. The procedure ends at step 330.

If maximum narrowing does not result in improved GNSS signal reception at the antenna 204, the system may use a lower percentage that provides the best quality i.e., smallest multipath index or most eliminated interferences, and the system may selectively reconfigure other parameters to change operating characteristics of the antenna in an attempt to improve signal quality. Alternatively, if narrowing does not provide adequate improvement, the system may return to the use of the full beamwidth and reconfigure other parameters.

Referring back to FIG. 2, the reconfigurable beam direction component 234 reconfigures the direction of the beam of the antenna 204 in response to receiving one or more commands from GNSS receiver 108. Before reconfiguration, the antenna 204 beam pattern is hemispherical and directed skyward. The system essentially divides the sky in quadrants, e.g., four quadrants, and before reconfiguration the antenna 204 is directed to all four quadrants. In certain environments, the multipath signals and interfering signals may be originating from higher elevation angles relative to the horizon and from different directions. Thus, and based on the assigned multipath index value being greater than or equal to a multipath threshold value and/or the overall power of the received signal being greater than or equal to a higher power threshold value, the system may command the reconfigurable beam direction component 234 to reconfigure the beam direction.

Specifically, the reconfigurable beam direction component 234 selectively switches particular antenna elements 105 in and out, to reconfigure the beam direction such that the signals 106 from particular quadrants are processed by the antenna 204 while signals 106 from other quadrants are not processed by the antenna 204. For example, the direction of the beam associated with the antenna 204 may be reconfigured such that the antenna 204 is directed to three of the four, two of the four quadrants, and so forth. The reconfiguring may occur incrementally as discussed above. Also, the reconfiguring occurs without the complex calculations performed to determine the direction of the jammer and/or the multipath source, such that the direction of the jammer and/or the source of the multipath are found essentially by trial and error as the antenna subsystem selectively eliminates the processing of signals from respective quadrants.

After the beam direction has been reconfigured, the antenna subsystem 200 provides signals to the GNSS receiver 108 over link 110. The processor 122 of the GNSS receiver 108 processes the received signals and determines if the associated multipath index value is still greater than or equal to the multipath threshold value and/or if the overall power of the signals 106 is still greater than or equal to the higher power threshold value. Based on this determination, the processor 122 may send one or more additional commands to the reconfigurable beam direction component 234 to again reconfigure the beam direction until the associated multipath index value is less than the multipath threshold value and/or the overall power of the signals 106 is less than the higher power threshold value. If after an iteration the associated multipath index value is determined to be less than the multipath threshold value and/or the overall power of the signals 106 is less than the higher power threshold value, the system continues to operate with the reconfigured beam direction, and thus, the GNSS receiver 108 processes the signals received by the reconfigured antenna to calculate position information in a known manner.

Figure 4:
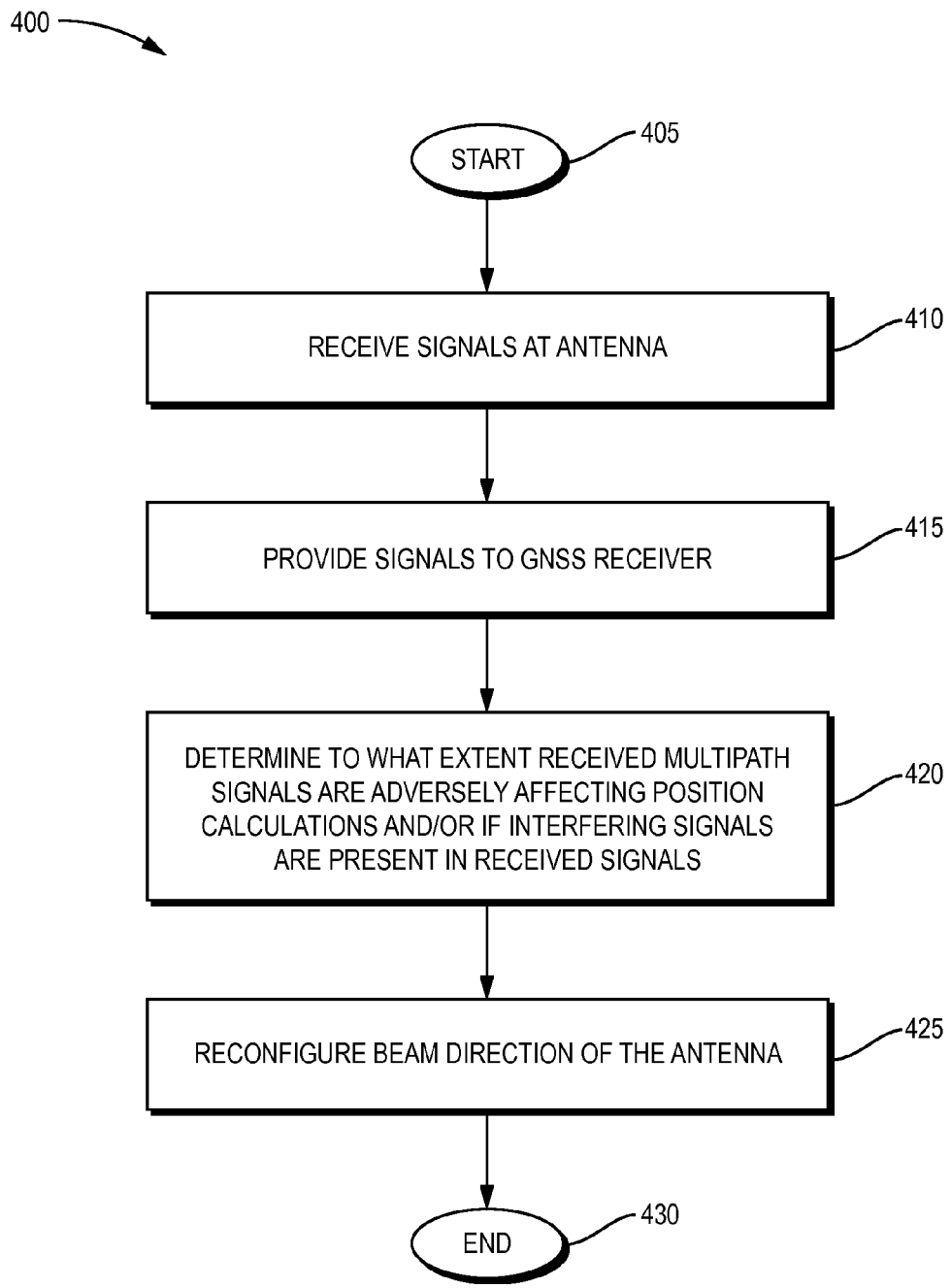
FIG. 4 is a flow chart of the operation of the system for reconfiguring a beam direction for the reconfigurable antenna subsystem.

FIG. 4 is a flow chart of the operations of the system for reconfiguring the beam direction for the reconfigurable antenna subsystem 200. The procedure 400 starts at step 405 and in step 410 the signals 106 are received at the antenna 204 of the reconfigurable antenna subsystem 200. Next, in step 415 the signals 106 are provided to the GNSS receiver 108. In step 420 the GNSS receiver 108 operates in a known manner to determine to what extent received multipath signals are adversely affecting position calculations and/or if interfering signals are present in the received signals. Specifically, a multipath index value is assigned to the received signals and compared to a multipath threshold value to determine the extent received multipath signals are adversely affecting position calculations. More specifically, the system determines if the assigned multipath index value is greater than or equal to the multipath threshold value. In addition, the system determines if the overall power of the received signals is above a high power threshold value, to determine if interfering signals are present.

The procedure continues to step 425 where the beam direction of the antenna 204 is reconfigured based on a determination that the received multipath signals are adversely affection position calculations and/or that interfering signals are present in the received signals. Specifically, one or more commands are sent from the GNSS receiver 108 to the reconfigurable antenna subsystem 200, and the reconfigurable beam direction component 234 reconfigures the beam direction of the antenna 204 by selectively switching antenna elements 105 in or out. It is noted that the reconfigurable beam direction component 234 may incrementally reconfigure the beam direction until either the assigned multipath index value is less than the multipath threshold value and/or the overall power of the received signals is less than the higher power threshold value, and/or the beam direction has been redirected a maximum number of times. The procedure ends at step 430.

The subsystem essentially tests various beam directions to determine which direction limitation, if any, results in improved GNSS signal reception at the antenna 204. The system may use a reconfiguration that results in a signal quality that has an acceptable, i.e., smallest, multipath index or a power level that indicates that the one or more sources of interference are in the directions from which signals are not being processed. The subsystem may then selectively reconfigure other parameters to change operating characteristics of the antenna in an attempt to improve signal quality. Alternatively, if reconfiguring the beam direction does not provide adequate improvement, the system may return to the use of the hemispherical beam direction, e.g., all four quadrants, and reconfigure other parameters.

Referring back to FIG. 2, the reconfigurable frequency bandwidth component 236 reconfigures, e.g., narrows, the frequency bandwidth associated with the antenna 204 in response to receiving one or more commands from GNSS receiver 108. Specifically, the spectrum analyzer 107, operating in a known manner, determines if noise or interfering signals have frequencies that are sufficiently different from the GNSS frequency of interest. That is, it is determined if the frequencies of the noise and/or interfering signals are beyond a threshold frequency band that includes the GNSS frequency of interest. If so, they system commands the reconfigurable frequency bandwidth component 236 to reconfigure the frequency bandwidth, e.g., narrow the frequency bandwidth, of the antenna 204 to essentially avoid the processing of the noise and/or interfering signals. In addition, and after the frequency bandwidth has been narrowed, the spectrum analyzer 107 may monitor the $C/N_0$ value and compare the $C/N_0$ value to the GNSS signal strength threshold value. The $C/N_0$ value being greater than or equal to the GNSS signal strength threshold value indicates that the GNSS satellite signals are sufficiently above the received noise and can thus be readily tracked. The frequency may be narrowed incrementally or the system may, depending on the application for which the system is to be utilized, selectively utilize different frequency bands such as L1/L2 only, or L1 only, etc.

Specifically, the reconfigurable frequency bandwidth component 236 reconfigures the frequency bandwidth by utilizing switchable antenna elements, switchable LNA filtering banks, tunable SAW filters, tunable bandpass filters, tunable matching network filters, or a combination thereof. For example, the reconfigurable frequency bandwidth component 236 may reconfigure the frequency bandwidth to only include the L1/L2 band, or the L1 band only, etc., by, for example, selectively utilizing a particular LNA filter. The reconfigurable frequency bandwidth component 236 thus reconfigures the frequency bandwidth such that the frequencies associated with the noise and/or interfering signals are treated as out-of-band signals by the antenna subsystem 200.

After the frequency bandwidth has been reconfigured, the antenna subsystem 200 provides the received signals 106 that are within the reconfigured frequency bandwidth to the GNSS receiver 108 over link 110. The processor 122 of the GNSS receiver 108 processes the received signals and determines if the $C/N_0$ value is above a predetermined low threshold and/or the overall power of the signals 106 is still greater than or equal to the higher power threshold value. Based on this determination, the processor 122 may send one or more additional commands to the reconfigurable frequency bandwidth component 234 to again reconfigure the frequency bandwidth until the overall power of the signals 106 is less than the higher power threshold value and/or the $C/N_0$ value is greater than or equal to a threshold value, in the manner described above. If the determined $C/N_0$ value is above the threshold value and/or the overall power of the signals 106 is less than the higher power threshold value, the system operates with the reconfigured frequency bandwidth.

Figure 5:
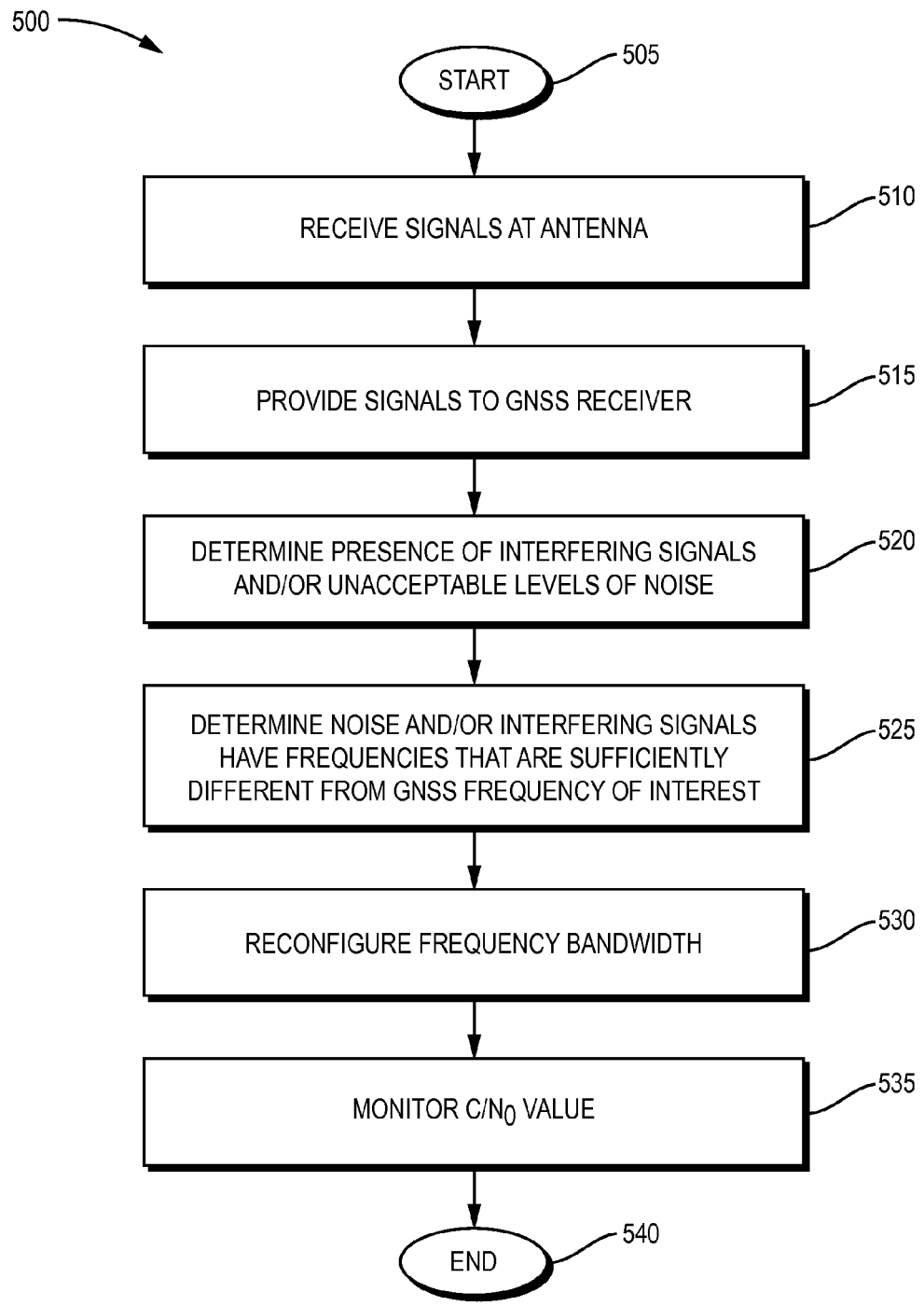
FIG. 5 is a flow chart of the operation of the system for reconfiguring a frequency bandwidth for the reconfigurable antenna subsystem.

FIG. 5 is a flow chart of the operations of the system for reconfiguring the frequency bandwidth for the reconfigurable antenna subsystem 200. The procedure 500 starts at step 505 and in step 510 the signals 106 are received at the antenna 204 of the reconfigurable antenna subsystem 200. Next, in step 515 the received signals 106 are provided to the GNSS receiver 108. In step 520 the GNSS receiver 108 operates in a known manner to determine if interfering signals and/or unacceptable levels of noise are present in the received signals. Specifically, the overall power of the received signal is compared to a higher power threshold value to determine if interfering signals are present and a $C/N_0$ value is compared to a threshold.

If the interference and/or noise are at unacceptable levels, the procedure continues to step 525 where the spectrum analyzer operates in a known manner and determines that noise and/or interfering signals have frequencies that are sufficiently different from the GNSS frequency of interest. In step 530 the frequency bandwidth of the antenna 204 is reconfigured. Specifically, one or more commands are sent from the GNSS receiver 108 to the reconfigurable antenna subsystem 200, and the reconfigurable frequency bandwidth component 236 reconfigures the frequency bandwidth of the antenna by selectively including respective filtering components in the signal path.

In step 535 the power level and the $C/N_0$ value of the received signals 106 are monitored. Specifically, the $C/N_0$ value and the power level are compared to respective threshold values. If the $C/N_0$ value is greater than or equal to the applicable threshold value, the system determines that the GNSS satellite signal is sufficiently above the noise such that the received GNSS codes and carriers can be readily tracked. If the $C/N_0$ value is below the threshold value, the subsystem determines that the GNSS satellite signal is not sufficiently above the noise, and the frequency bandwidth may again be reconfigured. Similarly, the system determines if the overall power level is above or below a threshold that indicates that an interfering signal is present.

It is noted that the reconfigurable frequency bandwidth component 236 may reconfigure the frequency bandwidth until the $C/N_0$ value is greater than or equal to the applicable threshold value and/or the overall power of the received signals is less than the higher power threshold value. Alternatively, the system may direct the reconfigurable frequency bandwidth component 236 to utilize frequency bands associated with selected GNSS frequencies as discussed above. The procedure ends at step 540.

Referring back to FIG. 2, the reconfigurable polarization component 238 reconfigures the polarization of the antenna 204 in response to receiving one or more commands from the GNSS receiver 108. In certain environments, the sky view of the antenna 204 may be obstructed by foliage, buildings, and so forth, such that the antenna 204 essentially does not receive direct path GNSS satellite signals and instead receives only weak multipath signals that are reflected to the antenna by the local environment. In such situations, the overall power of the received signals 106 is below a predetermined lower power threshold value, and the GNSS receiver may thus lose lock.

In such an environment, the polarization, either circular or linear, may be reconfigured by the reconfigurable polarization component 238 from the conventional right hand polarization, which is utilized for the receipt of line of sight GNSS satellite signals, to left hand polarization Such that the antenna 204 is more sensitive to the relatively weak multipath signals. The GNSS receiver then remains locked to the received multipath signals and processes the received multipath signals to determine an associated estimated position. While the information in the received mulitpath signals results in the GNSS receiver 108 calculating positions that are not highly accurate, at least the receiver continues to provide position information to the user.

The reconfigurable polarization component 238 may reconfigure the polarization by changing the phase of the antenna feed line (e.g., by selectively tying the feed line to ground). The antenna is then essentially optimized to receive the reflected GNSS satellite signals. The system may, at certain times and/or if the signal power exceeds a predetermined threshold, change the phase of the feed line back to operate using right hand polarization, and test if the signal power of the direct path signals are above the predetermined lower threshold. If so, the system again utilizes the direct path GNSS satellite signals to determine a more accurate position.

Figure 6:
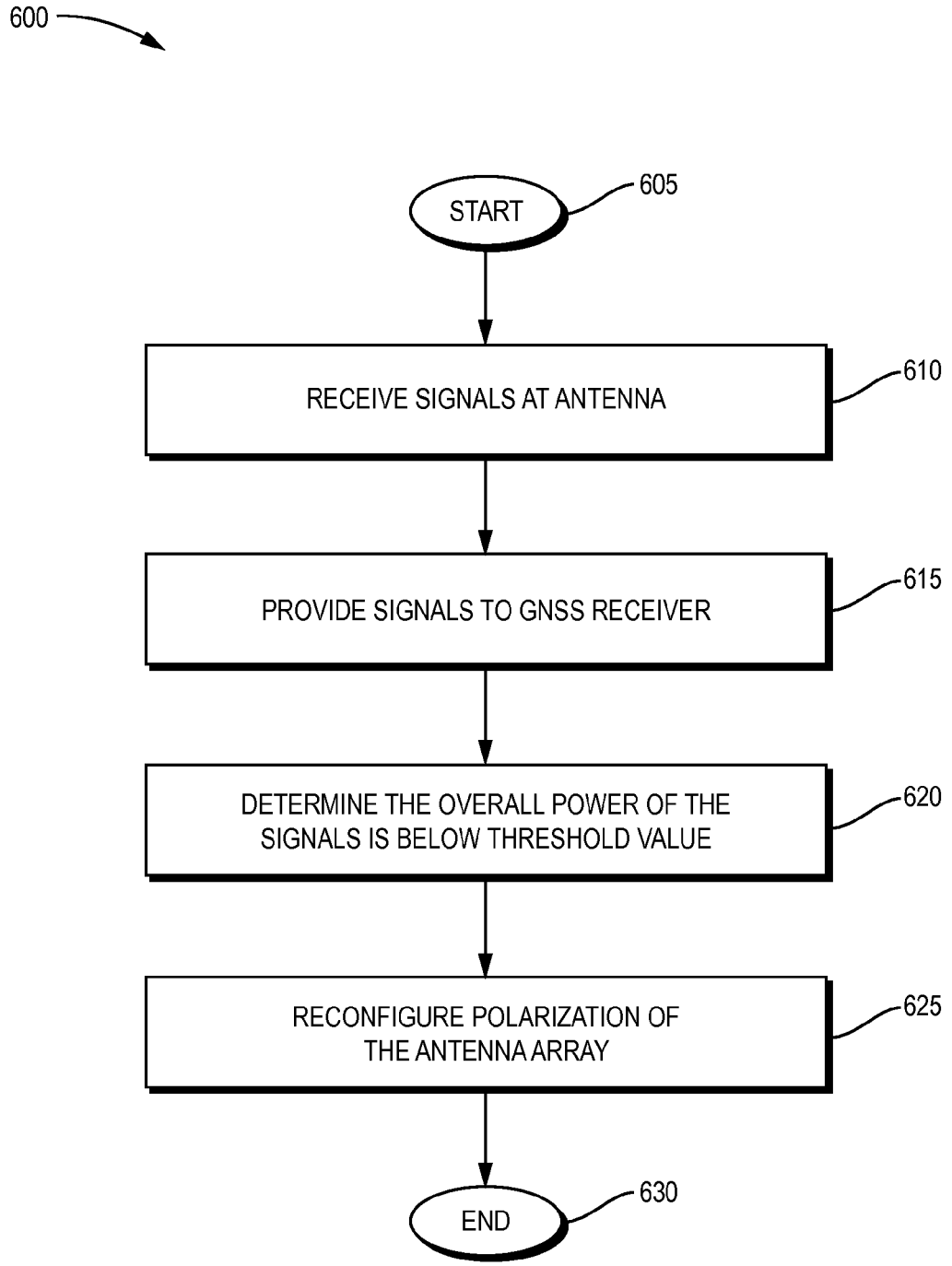
FIG. 6 is a flow chart of the operation of the system for reconfiguring a polarization for the reconfigurable antenna subsystem.

FIG. 6 is a flow chart of the operations of the system for reconfiguring the polarization for the reconfigurable antenna subsystem 200. The procedure 600 starts at step 605 and in step 610 the signals 106 are received at the antenna 204 of the reconfigurable antenna subsystem 200. Next, in 615 the received signals 106 are provided to the GNSS receiver 108. In step 620 the receiver 108 determines that the overall power of the signals 106 is less than a lower power threshold value indicating that the antenna 204 is obstructed.

The procedure continues to step 625 and the polarization of the antenna 204 is reconfigured from right hand polarization to left hand polarization. For example, the reconfigurable polarization component 238 changes the phase of the antenna feed line by selectively tying the antenna feed line to ground. The procedure ends at step 630.

Figure 7:
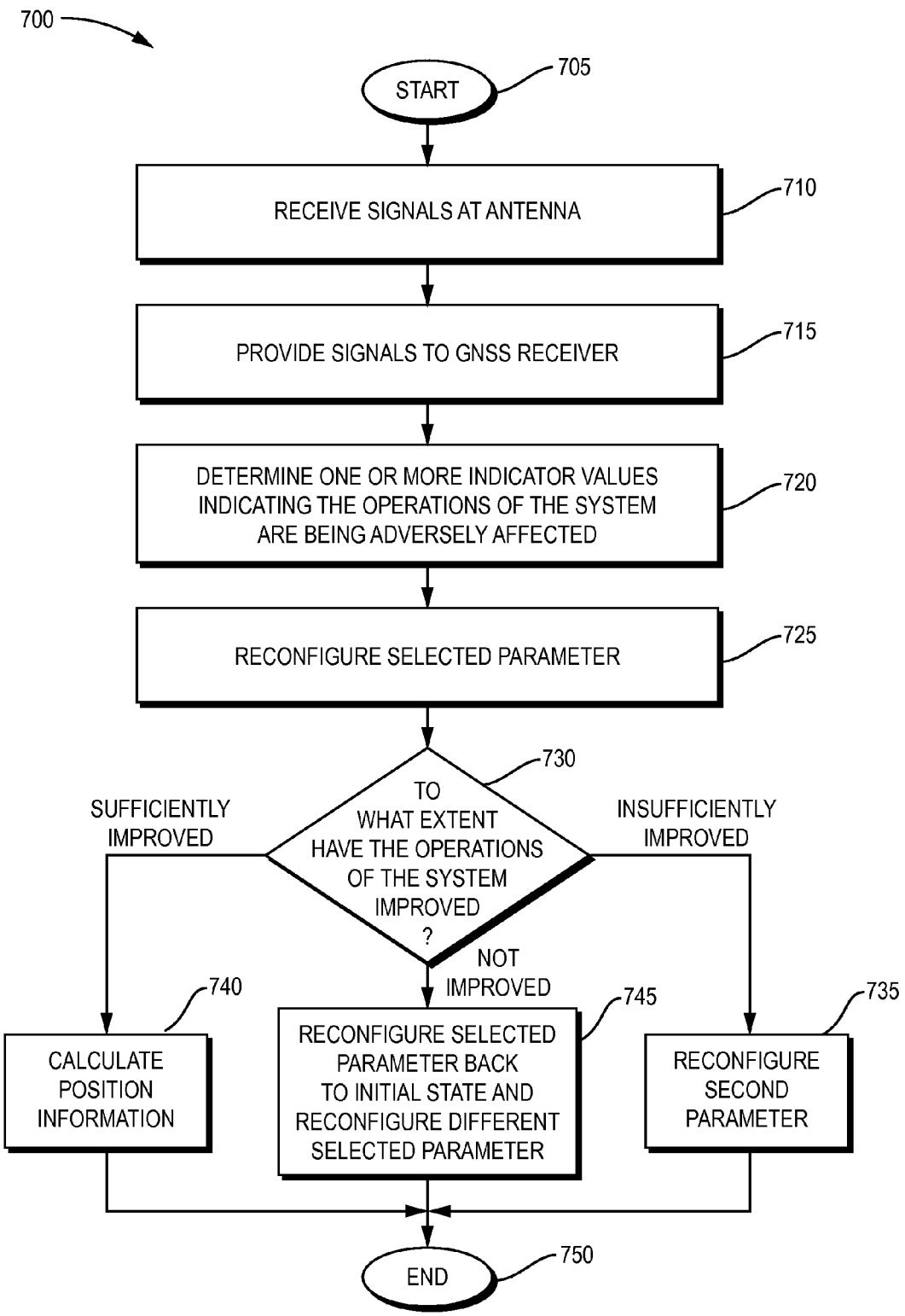
FIG. 7 is a flow chart of the operation of the system for reconfiguring one or more parameters for the reconfigurable antenna subsystem.

FIG. 7 is a flow chart of the operations of the system for reconfiguring one or more parameters for the reconfigurable antenna subsystem 200. The procedure 700 starts at step 705 and in step 710 the signals 106 are received at antenna 204 of the reconfigurable antenna subsystem 200. Next, in step 715 the signals 106 are provided to the GNSS receiver 108. In step 720 the GNSS receiver 108 operates in a known manner to determine one or more indicator values that are associated with the operating characteristics of the antenna, where the values may indicate that the operations of the system are being adversely affected. Specifically, the GNSS receiver determines if the GNSS satellite signals are essentially buried in received noise, if interfering signals are present in the received signals, if multipath signals are adversely impacting position calculations, and/or if the antenna is obstructed.

More specifically, a multipath index value is assigned to the received signal and compared to a multipath threshold value to determine the extent to which received multipath signals are adversely affecting position calculations. If the assigned multipath index value is greater than or equal to the multipath threshold value, the system determines that the received multipath signals are adversely affecting position calculations. In addition, or alternatively, the overall power of the received signal is compared to one or more power threshold values. Specifically, the overall power of the received signal being greater than or equal to a higher power threshold value indicates the presence of interfering signals. In addition, the overall power of the received signal being below a lower power threshold value indicates that the antenna 204 is obstructed. Moreover the $C/N_0$ value is compared to a GNSS satellite signal strength threshold value. If the $C/N_0$ value is below the GNSS signal strength threshold value, the system determines that the GNSS satellite signal is essentially buried in the noise.

In step 725, and based on determining that the operations of the system are being adversely affected, a selected parameter of the one or more parameters of the antenna 204 of the reconfigurable antenna subsystem 200 is reconfigured. Such parameters may include, but are not limited to, a radiation pattern (e.g., beamwidth and beam direction), a frequency bandwidth, and a polarization for the antenna 204. For example, and based on a determination that one or more interfering signals are present, the GNSS receiver 108 sends one or more commands to the reconfigurable antenna subsystem 200 to reconfigure a first selected parameter of the one or more parameters. In the example, the GNSS receiver 108 sends one or more commands to reconfigure the beamwidth. In response to receiving the one or more commands, the reconfigurable beamwidth component 232, may, for example, selectively switch antenna elements in and/or out to narrow the beamwidth of the antenna 204. Alternatively, the GNSS receiver may send commands to instead reconfigure the direction of the antenna, or reconfigure the frequency band, and so forth.

At step 730 and after the selected parameter has been reconfigured, the system determines to what extent the operations of the system have improved. The system determines if the operations of the system have sufficiently improved, insufficiently improved, or not improved. Specifically, the system utilizes the indicators and the thresholds values in the manner described above to determine if the operations of the system have improved. For example, the power of the received signals may again be compared to the higher threshold value.

If the power of the signal has decreased, but is still, for example, determined to be too high (e.g., one or more indicator values remaining near associated high threshold values), a second selected parameter may be reconfigured. Thus, if at step 730 it is determined that the operations of the system have improved but have not sufficiently improved (e.g., near a utilized threshold value), the procedure continues to step 735 and a second selected parameter may be reconfigured to further improve the operations of the system. For example, after the beamwidth has been reconfigured, one or more commands may be sent to the reconfigurable antenna system 200 such that reconfigurable beam direction component 234 reconfigures the beam direction. Alternatively, instead of reconfiguring the beam direction, a different second parameter may be reconfigured, such as, for example, the frequency bandwidth.

If at step 730, it is determined that the operations of the system have sufficiently improved (e.g., one or more indicator values below associated high threshold values), the procedure continues to step 740 and the system operates as reconfigured and calculates position information utilizing the received signals. For example, and as described above, the power of the received signals may again be compared to the higher threshold value after the selected parameter has been reconfigured. If the power of the received signals is sufficiently below the higher threshold value, the system may determine that operations of the system are no longer being adversely affected by the interfering signals and further reconfiguration is not required.

If at step 730, it is determined that the operation of the system has not improved, the procedure continues to step 745 and the selected parameter may be reconfigured back to its initial state and a different selected parameter may be reconfigured to try to improve the operations of the system. For example, the reconfigurable beamwidth component 232 may reconfigure the beamwidth (e.g., widen) back to the conventional hemispherical coverage. Next, a different selected parameter may be reconfigured t in an attempt to reduce the adverse effects of the interfering signals on the system. Thus, the system may command that the beam direction be reconfigured by the reconfigurable beam direction component 234. For example, it is noted that the beam direction of the antenna may be reconfigured in a trial and error manner over one or more quadrants to determine if changing the beam direction improves the operations of the system.

In addition, it is noted that additional different parameters associated with the antenna 204 may also be reconfigured, in a trial and error manner, until the operating characteristics of the reconfigurable antenna system 200 sufficiently improve. For example, once the antenna is reconfigured to sufficiently reduce the adverse effects of the interfering signals, the subsystem may reconfigure one or more other antenna parameters to, for example, reduce the adverse effects of multipath signals, and so forth. The procedure then ends at 750.

Thus, the reconfigurable antenna subsystem may selectively and dynamically adjust one or more of the parameters. Again, the parameters may be selected based on one or more of the indicator values and the parameters may be changed essentially in a trial and error manner to test if reconfiguring a particular characteristic of the antenna improves GNSS signal reception. By adjusting the parameters in this manner, the system may utilize a single antenna in place of multiple antennas and/or avoid complex processing to determining the directions of jammers for null steering and so forth, resulting in significant savings in terms of cost and complexity.

The foregoing description described certain example embodiments. It will be apparent, however, that other variations and modifications may be made to the described embodiments, with the attainment of some or all of their advantages. For example, any number of parameters associated with the antenna may be reconfigured simultaneously, consecutively, or incrementally, and the parameters may be reconfigured in any order. The switches may be electronic, mechanical or operate as software in one or more processors. The processors that determine the indicators and/or compare the indicators to the thresholds may be located at the reconfigurable antenna subsystem, at the receiver, or both. In addition, the switches may be utilized to activate filters, switch antenna elements in or out, selectively include inductors in the antenna circuitry, and selectively connect to ground. Accordingly, the foregoing description is to be taken only by way of example, and not to otherwise limit the scope of the disclosure. It is the object of the appended claims to cover all such variations and modifications as come within the true spirit and scope of the disclosure.

What is claimed is:
1. A system comprising:
an antenna subsystem including at least a processor and a memory, the antenna subsystem further including an antenna having one or more antenna elements and one or more selectable switches, the antenna subsystem configured to:
receive signals from one or more GNSS satellites,
transmit the received signals to a GNSS receiver,
receive at a first time one or more first commands from the GNSS receiver based on at least one first indicator value that is associated with one or more operating characteristics of the antenna, where the at least one first indicator value indicates that operations of the GNSS receiver to perform position calculations are being adversely affected,
selectively operate, in response to receiving the one or more first commands from the GNSS receiver, the one or more selectable switches to reconfigure one or more parameters of a plurality of parameters associated with the one or more of the operating characteristics of the antenna to change the one or more operating characteristics of the antenna,
receive at a second time one or more additional commands from the GNSS receiver based on at least one second indicator value that is associated with the one or more operating characteristics of the antenna, where the at least one second indicator value indicates that the operations of the GNSS receiver to perform the position calculations are still being adversely affected, and selectively operate, in response to receiving the one or more additional commands from the GNSS receiver, the one or more selectable switches to reconfigure the one or more parameters of the plurality of parameters associated with the one or more operating characteristics of the antenna to again change the one or more operating characteristics of the antenna.

2. The system of claim 1 wherein the one or more switches are selectively operated to reconfigure parameters that adjust a beamwidth, a beam direction, a frequency bandwidth, and a polarization.

3. The system of claim 2 wherein the beamwidth, the beam direction, the frequency bandwidth, or a combination thereof are reconfigured if the at least one first indicator value is an indication that a received signal power is greater than or equal to a higher power threshold value.

4. The system of claim 2 wherein the polarization is reconfigured if the at least one first indicator value is an indication that a received signals power is below a lower power threshold value.

5. The system of claim 2 wherein the beamwidth, the beam direction, or both are reconfigured if the at least one first indicator value is an indication that a multipath index value assigned to the received signals is greater than or equal to a multipath index threshold value.

6. The system of claim 2 wherein the beamwidth, the beam direction, the frequency bandwidth, or a combination thereof are reconfigured if the at least one first indicator value is an indication that a carrier-to-noise density ($C/N_0$) value for the received signals from the one or more GNSS satellites is below a GNSS signal strength threshold value.

7. The system of claim 1 further comprising:
the GNSS receiver configured to calculate position information from the received signals from the one or more GNSS satellites after reconfiguring the one or more parameters.

8. The system of claim 1 wherein the GNSS receiver is configured to analyze the signals transmitted from the antenna subsystem to the GNSS receiver.

9. A method comprising:
receiving, at an antenna subsystem having at least a processor and a memory, signals from one or more GNSS satellites, wherein the antenna subsystem includes an antenna having one or more antenna elements and one or more selectable switches;
transmitting the received signals from the antenna subsystem to the GNSS receiver;
receiving, at a first time and at the antenna subsystem, one or more first commands from the GNSS receiver based on at least one first indicator value that is associated with one or more operating characteristics of the antenna, where the at least one first indicator value indicates that the operations of the GNSS receiver to perform position calculations are being adversely affected;
operating, in response to receiving the one or more first commands from the GNSS receiver, the one or more selectable switches to reconfigure one or more parameters of a plurality of parameters associated with the one or more operating characteristics of the antenna to change the one or more operating characteristics of the antenna;
receiving, at a second time and at the antenna subsystem, one or more additional commands from the GNSS receiver based on at least one second indicator value that is associated with the one or more operating characteristics of the antenna, where the at least one second indicator value indicates that the operations of the GNSS receiver to perform the position calculations are still being adversely affected; and
operating, in response to receiving the one or more additional commands from the GNSS receiver, the one or more selectable switches to reconfigure the one or more parameters of the plurality of parameters associated with the one or more operating characteristics of the antenna to again change the one or more operating characteristics of the antenna.

10. The method of claim 9 wherein the one or more parameters include a beamwidth, a beam direction, a frequency bandwidth, and a polarization, and wherein the one or more parameters are reconfigured by selectively operating the one or more switches to perform at least one of the following:
include or exclude particular antenna elements, utilize one or more filters, tune one or more filters, tie an antenna line to ground, or any combinations thereof.

11. The method of claim 10 wherein the beamwidth, the beam direction, the frequency bandwidth, or a combination thereof are reconfigured if the at least one first indicator value is an indication that a received signal power is greater than or equal to a higher power threshold value.

12. The method of claim 10 wherein the polarization is reconfigured if the at least one first indicator value is an indication that a received signal power is below a lower power threshold value.

13. The method of claim 10 wherein the beamwidth, the beam direction, or both are reconfigured if the at least one first indicator value is an indication that a multipath index value assigned to the received signals is greater than or equal to a multipath index threshold value.

14. The method of claim 10 wherein the beamwidth, the beam direction, the frequency bandwidth, or a combination thereof are reconfigured if the at least one first indicator value is an indication that a carrier-to-noise density ($C/N_0$) value for the received signals from the one or more GNSS satellites is below a GNSS signal strength threshold value.

15. The method of claim 9 wherein the GNSS receiver calculates position information from the received signals from the one or more GNSS satellites after the one or more parameters have been reconfigured.

16. The method of claim 9 wherein the GNSS receiver utilizes a spectrum analyzer to analyze the received signals to determine the at least one first indicator value.

17. A system, comprising:
a GNSS receiver, having at a processor and a memory, the GNSS receiver configured to:
receive signals from an antenna subsystem having an antenna that includes one or more antenna elements and one or more selectable switches,
analyze the received signals to determine if at least one first indicator value, that is associated with operating characteristics of the antenna indicates that operations of the system to perform position calculations using the received signals are being adversely affected, and
send, at a first time, one or more first commands to the antenna subsystem in response to determining that the at least one first indicator value indicates that the operations of the system are being adversely affected;
reanalyze and send, at a second time, one or more additional commands to the antenna subsystem in response to determining that at least one second indicator value indicates that the operations of the system are still being adversely affected; and the antenna subsystem configured to:
  operate, in response to receiving the one or more first commands, the one or more selectable switches to reconfigure one or more parameters of the plurality of parameters associated with the operating characteristics of the antenna; and
  operate, in response to receiving the one or more additional commands, the one or more selectable switches to reconfigure the one or more parameters of the plurality of parameters associated with the operating characteristics of the antenna.

18. The system of claim 17 wherein the one or more parameters include beamwidth, beam direction, frequency bandwidth, and polarization and wherein the one or more parameters are reconfigured utilizing the one or more switches to include or exclude particular antenna elements, utilize one or more filters, tune one or more filters, include one or more inductors in antenna circuitry, or combination thereof.

19. The system of claim 18 wherein the beamwidth, the beam direction, the frequency bandwidth, or a combination thereof are reconfigured if the at least one first indicator value is an indication that a received signal power is greater than or equal to a higher power threshold value.

20. The system of claim 19 wherein the polarization is reconfigured if the at least one first indicator value is an indication that a received signal power is below a lower power threshold value.

21. The system of claim 1 wherein the at least one first indicator value is substantially equal to the at least one second indicator value or the at least one first indicator value differs from the at least one second indicator value.

22. The method of claim 9 wherein the at least one first indicator value is substantially equal to the at least one second indicator value or the at least one first indicator value differs from the at least one second indicator value.

* * * * *